United States Patent [19]

Earle

[11] Patent Number: 5,722,635
[45] Date of Patent: Mar. 3, 1998

[54] CONTAINER VALVE COUPLING

[75] Inventor: Anthony Earle, Harrow Weald, England

[73] Assignee: Eastman Kodak Company, Rochester, N.Y.

[21] Appl. No.: 549,348

[22] Filed: Oct. 27, 1995

[30] Foreign Application Priority Data

Oct. 29, 1994 [GB] United Kingdom ............ 9421804

[51] Int. Cl.⁶ ................................................. F16L 37/28
[52] U.S. Cl. ............................ 251/142.7; 251/149.6
[58] Field of Search ........................ 251/149.6, 149.7

[56] References Cited

U.S. PATENT DOCUMENTS

| | | | |
|---|---|---|---|
| 497,896 | 5/1893 | Ruppel . | |
| 1,066,066 | 7/1913 | Vidy | 251/149.7 |
| 2,612,389 | 9/1952 | MacGlashan, Jr. | 251/149.7 |
| 2,630,131 | 3/1953 | Snyder . | |
| 3,086,747 | 4/1963 | Sauer | 251/149.7 |
| 3,291,152 | 12/1966 | Comer | 137/614.04 |
| 3,343,718 | 9/1967 | Siegel et al. | 222/1 |
| 3,490,482 | 1/1970 | Sachs et al. | 137/205 |
| 3,513,887 | 5/1970 | Limandri | 141/207 |
| 4,128,326 | 12/1978 | Selak | 354/317 |
| 4,248,514 | 2/1981 | Watkins | 354/299 |
| 4,311,117 | 1/1982 | von Taschitzki . | |
| 4,421,146 | 12/1983 | Bond et al. | 141/349 |
| 4,530,377 | 7/1985 | Peters . | |
| 4,747,422 | 5/1988 | Chung . | |
| 4,763,683 | 8/1988 | Carmack | 137/68.1 |
| 4,949,745 | 8/1990 | McKeon | 137/15 |
| 4,953,758 | 9/1990 | Passalacqua . | |
| 4,958,666 | 9/1990 | Kocourek et al. | 141/114 |
| 4,964,544 | 10/1990 | Hanna et al. . | |
| 4,991,635 | 2/1991 | Ulm | 141/346 |
| 5,156,308 | 10/1992 | Aoyama | 222/145 |

FOREIGN PATENT DOCUMENTS

| | | | |
|---|---|---|---|
| 0 270 302 B1 | 5/1991 | European Pat. Off. . | |
| 500371 A2 | 8/1992 | European Pat. Off. | G03D 3/06 |
| 2253377 | 6/1975 | France | B67C 11/06 |
| 1457578 | 7/1970 | Germany | 251/149.7 |
| 25 41 372 | 3/1977 | Germany . | |
| 3208968 | 9/1983 | Germany | G03D 13/02 |
| 2134612 | 8/1984 | United Kingdom | 251/149.6 |

Primary Examiner—A. Michael Chambers
Attorney, Agent, or Firm—Charles E. Snee, III

[57] ABSTRACT

Described herein is an improved valve arrangement for use in connecting reservoirs containing photographic processing solutions with photographic processing apparatus. The valve arrangement comprises a valve (20) and a probe (10, 18). The valve (20) comprises a body portion (22) secured to the reservoir. A guide block (30) is fixed to the body portion (22) and carries a cap portion (32, 34, 36) defining a chamber (38) therebetween. The guide block (30) houses a plunger (42, 50, 66) in a chamber (58), the plunger (42, 50, 66) being biased by a spring (46) to seal against an opening (60) in the body portion (22). The probe (10, 18) is used to engage the plunger (42, 50, 66) and push it away from the body portion (22) to provide fluid communication between the reservoir and the processing apparatus.

8 Claims, 2 Drawing Sheets

CONTAINER VALVE COUPLING

FIELD OF THE INVENTION

The present invention relates to valves and is more particularly, although not exclusively, concerned with valves for use in containers for providing processing solutions to photographic processing apparatus. The valve provides a connection between the containers and the associated processing apparatus.

BACKGROUND OF THE INVENTION

Containers in the form of cartridges are used to supply ready-to-use processing solutions to photographic processing apparatus. These containers are designed to be easily and quickly coupled to the apparatus. Moreover, due to the nature of the processing solutions, it is desirable that the coupling of the container to the apparatus is clean and can be carried out by unskilled operators.

PROBLEM TO BE SOLVED BY THE INVENTION

In known cartridge arrangements, once the cartridge has been connected to the apparatus and then subsequently removed, the contents of the cartridge may leak if not handled with care. Furthermore, in many cases, it is not possible to replace the cartridge on the apparatus and maintain the original high level of sealing.

The coupling arrangement between the cartridge and the apparatus may also be such that it is not possible to empty and fill the cartridge quickly.

SUMMARY OF THE INVENTION

It is therefore an object of the present invention to provide an improved valve arrangement for a cartridge which provides improved coupling between the cartridge and the apparatus to which it is to be attached.

In accordance with one aspect of the present invention, there is provided a valve arrangement for connecting a container to apparatus which is to be fed from the container, the arrangement comprising a probe and a valve which comprises:

a first portion having an opening formed therein which extends along its length;

a second portion fixedly connected to the first portion and having a chamber formed therein which is in fluid communication with the interior of the container, one wall of the chamber being defined by a surface of the first portion;

plunger means located in the chamber, a portion of the plunger means extending into the opening of the first portion; and spring means associated with the plunger means operable to bias the plunger means in a first position to seal against the surface of the first portion, the plunger means carrying seal means for sealing against the surface;

characterized in that the probe operates the plunger means to move it from the first position to a second position against the action of the spring means to provide fluid communication between the chamber and the opening of the first portion.

In accordance with another aspect of the present invention, there is provided a container having a valve arrangement as described above.

ADVANTAGEOUS EFFECT OF THE INVENTION

The valve arrangement in accordance with the present invention has the advantage that it does not leak when the container having the valve is removed from apparatus to which it was previously connected.

Moreover, the valve arrangement can be of sufficient size to enable the container to be filled and emptied many times in quick succession.

BRIEF DESCRIPTION OF THE DRAWINGS

For a better understanding of the present invention, reference will now be made, by way of example only, to the accompanying drawings in which.

DETAILED DESCRIPTION OF THE INVENTION

The Figures illustrate a valve arrangement which is preferably utilized in the orientation shown, that is, with a cartridge oriented such that the valve is in the lower part of the cartridge when it is attached to the apparatus which is to be supplied with fluid therefrom. However, the valve arrangement in accordance with the present invention is not limited solely to use in this particular orientation.

Figure 1:
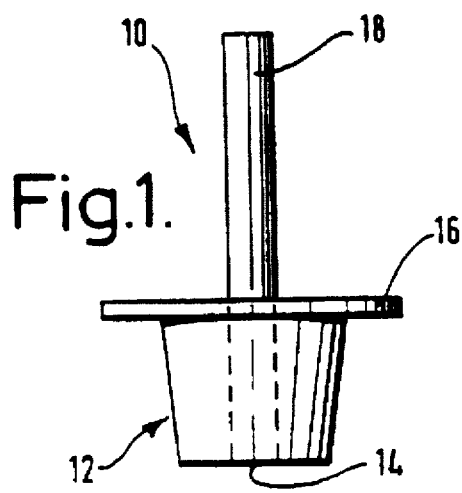
FIG. 1 shows a side elevation of a probe for use with a valve constructed in accordance with the present invention.

In FIG. 1, a probe 10 is illustrated which comprises a substantially conical body portion 12 having a a fluid communication passage, such as a central bore 14 formed therethrough. An annular lip portion 16 is formed around the base of the conical portion 12. Attached to the conical portion 12 is a tube portion 18, which forms a fluid connection with the bore 14 of the conical portion 12.

In use, the probe 10 is fixedly attached to a processing machine (not shown) or to any other device to which a cartridge is to be coupled. Naturally, the conical portion 12 need not be so shaped and may form an integral part of the machine or device itself.

Figure 2:
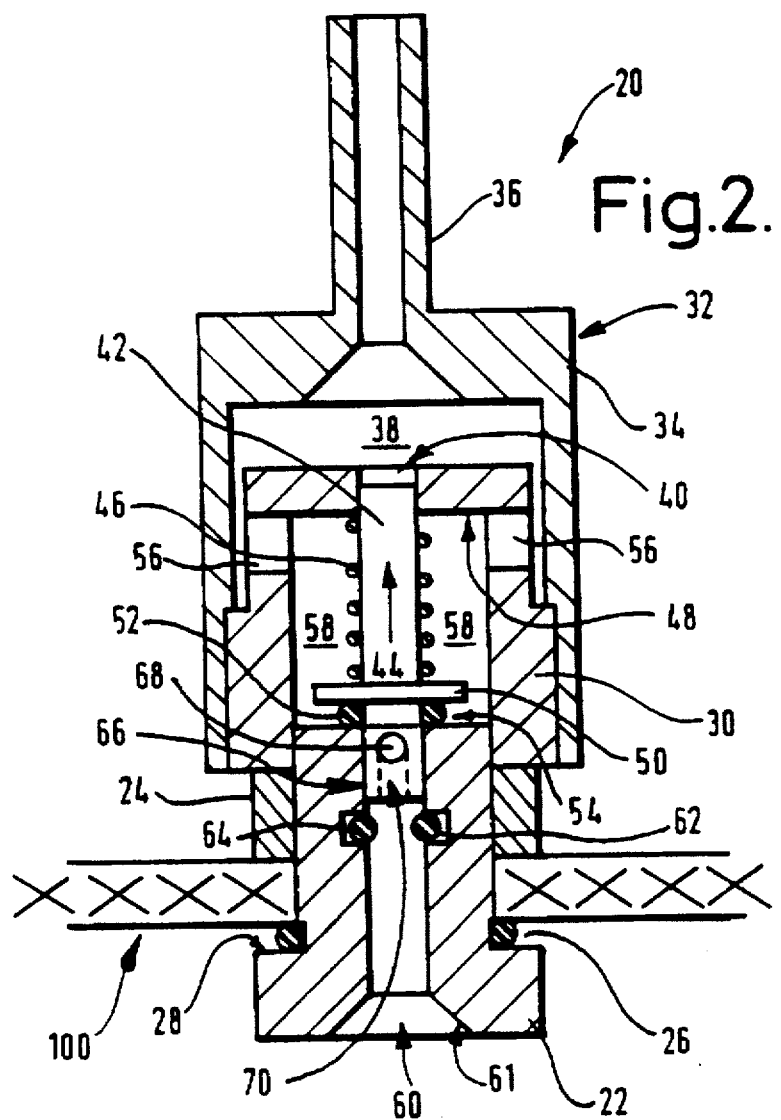
FIG. 2 shows a sectioned side elevation of a valve constructed in accordance with the present invention attached to a part of a cartridge wall.

FIG. 2 illustrates a valve 20 which comprises a hollow body 22 of circular cross-section which extends through a wall 100 of a cartridge (not shown in detail). The body 22 is clamped to the wall 100 by means of a locking nut 24. The locking nut 24 forces the wall 100 into engagement with an O-ring seal 26 positioned adjacent a flange portion 28 of the body 22.

A hollow guide block 30 having a circular cross-section is attached to the body 22 at its end remote from the flange portion 28. The block 30 carries a valve cap 32 which comprises a body portion 34 and a pipe portion 36. Pipe portion 36 is designed to be connected to a pipe (not shown) located in the cartridge and which extends to the top thereof. A chamber 38 is defined between the block 30 and the body portion 34 of the valve cap 32 as shown. The chamber 38 is fluidly connected to the interior of the cartridge byway of pipe portion 36.

The guide block 30 has a central bore 40 formed in wall portion 48 for receiving a plunger 42 which is movable, in a direction indicated by arrow 44, against the action of a helical spring 46. Spring 46 is retained between the wall portion 48 of block 30 and an annular shoulder portion 50 provided on the plunger 42. An O-ring seal 52 is situated on the plunger 42 between the shoulder portion 50 and face 54 of the body 22.

As shown in FIG. 2, the shoulder portion 50 is forced by the action of spring 46 to engage O-ring seal 52 and to press it against face 54 of body 22 thereby providing a seal. Block 30 has a plurality of holes 56 (only two of which are shown) formed around its circumference which provide fluid communication between the interior 58 of the guide block 30 and the chamber 38.

Body 22 has an opening 60 formed therein which extends along its entire length. The opening 60 has a conical shoulder portion 61 at the free end of the body 22 as shown. An O-ring seal 62 is located in an annular recess 64 formed in the opening 60.

End 66 of plunger 42 has a a fluid communication passage, such as a vent hole 68 therethrough which communicates with a bore 70 which faces opening 60 in body 22. Bore 70 is generally perpendicular to the vent hole 68, but this is not essential provided fluid communication is provided between hole 68 and bore 70.

Figure 3:
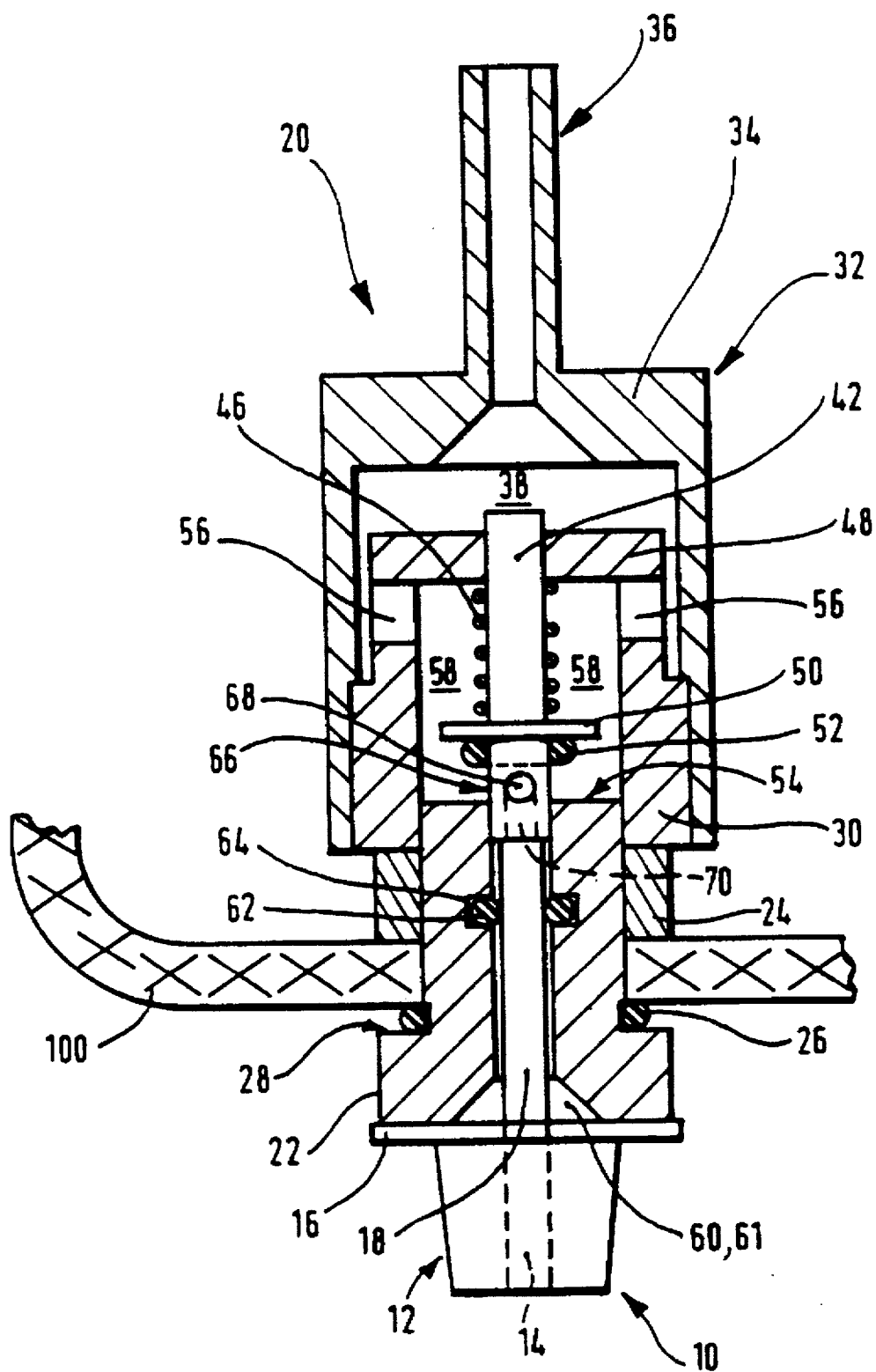
FIG. 3 is a sectioned side elevation illustrating the connection between the probe and the valve shown in FIGS. 1 and 2 respectively.

FIG. 3 illustrates engagement between the probe 10 and valve 20. Tube portion 18 of the probe 10 is inserted into the conical portion 61 of opening 60 in the body 22, the conical portion 61 guiding the tube portion 18 towards the middle of the opening 60. As the tube portion 18 is inserted into the opening 60, it passes O-ring seal 62 retained in recess 64 and then engages end 68 of the plunger 42. As the tube portion 18 is inserted further the plunger 42 is pushed in the direction of arrow 44 (FIG. 2) against the action of the spring 46 so that vent hole 68 opens out into chamber 58 in guide block 30 and fluid connection is established between the cartridge (not shown) and the apparatus to which the probe 10 is connected.

Insertion of the probe 10 into the valve 20 provides sufficient movement to lift the O-ring seal 52 off its seat on surface 54 and for the vent hole 68 to clear body 22. The length of tube portion 18 of the probe is designed so that vent hole 68 communicates with chamber 58 when annular shoulder 16 is adjacent the body 22 of the valve 20. O-ring seal 62 in recess 64 seals against the outer surface of the tube portion 18 to prevent leakage of fluid through opening 60 along the outside of tube portion 18.

It is to be noted that valve cap 32 merely forms a connection between the valve 20 and a pipe located within the cartridge, and is not required if valve 20 is not to be connected to a pipe in the cartridge. In this case, processing solution in the cartridge can flow directly into chamber 58 through holes 56.

In the particular embodiment described and illustrated, processing solution in the cartridge (not shown) is then fed from the top of the cartridge by means of a pipe located therein and not shown, through pipe portion 36 of the valve cap 32 into chamber 38, through holes 56 and into chamber 58, through hole 68 and into bore 70 and then into bore 14 of the probe 10 to the processing apparatus.

Fluid can be returned to the cartridge via the valve 20 by being pumped through bore 14, into bore 70, through vent hole 68 and into chamber 58, through holes 56 into chamber 38, and then through pipe portion 36 of the valve cap 32 into the cartridge. Once pumping is complete, the cartridge and associated valve 20 can be removed from the probe 10. During removal, the plunger 42 returns to its undisplaced position as shown in FIG. 2 due to the action of spring 46 to seal against surface 54 of body 22.

In the case where valve cap 32 is not required, the cartridge is emptied by gravity and refilled using a pump. It will be readily understood that it is also possible to empty the cartridge using a pump and to refill it by gravity if the cartridge is arranged to be oriented with the valve at the top when attached to the apparatus.

Furthermore, the valve arrangement of the present invention is not limited to use in a vertical orientation. The cartridge may have any suitable orientation and at least one pump can be utilized to effect transfer of fluid from and to the cartridge.

The valve in accordance with the present invention utilizes O-ring seals to prevent leakage of liquid. This means that cartridges to which the valves are attached can be put on and removed from a processing machine many times.

Naturally, the valve can be modified to fit different sizes of cartridges and to suit fluid flow of any suitable processing apparatus.

Although the probe 10 has been illustrated and described as having the configuration shown in FIG. 1, it will be readily appreciated that any other suitable configuration may be utilized for engagement with the valve.

What is claimed is:

1. A valve arrangement for connecting a container having a wall, to apparatus which is to be fed fluid from the container, said arrangement comprising:
   a probe;
   a first fluid communication passage formed in said probe;
   a first valve portion having an opening formed therein for receiving said probe, said opening extending along a length of said first valve portion;
   a second valve portion connected to said first valve portion, said second valve portion having a first chamber formed therein, said first chamber being in fluid communication with an exterior of said second valve portion, and a surface of said first valve portion defining a wall of said first chamber;
   a bore in said second valve portion opposite said opening;
   a plunger slidably mounted in said opening, extended into said first chamber and slidably mounted in said bore;
   a seal carded by said plunger for sealing against said surface;
   a helical spring surrounding and biasing said plunger to a first position in which said seal engages said surface; and
   a second fluid communication passage formed in said plunger,
   wherein when said probe is inserted into said opening, said probe engages said plunger to move said plunger against said spring to a second position in which said second fluid communication passage communicates with said first chamber.

2. A valve arrangement according to claim 1, further comprising:
   an outer portion carried by said second valve portion, said outer portion having a second chamber formed therein which is in fluid communication with said first chamber, and said outer portion having a fluid passageway portion for fluid connection with the container.

3. A container and valve arrangement, comprising:
   a container having a wall;
   a probe;
   a first fluid communication passage formed in said probe;
   a first valve portion having an opening formed therein for receiving said probe, said opening extending along a length of said first valve portion;

means for sealingly mounting said first valve portion to said wall with said opening extending into said container;

a second valve portion connected to said first valve portion, said second valve portion having a first chamber formed therein, said first chamber being in fluid communication with an exterior of said second valve portion, and a surface of said first valve portion defining a wall of said first chamber;

a bore in said second valve portion opposite said opening;

a plunger slidably mounted in said opening, extended into said first chamber and slidably mounted in said bore;

a seal carded by said plunger for sealing against said surface;

a helical spring surrounding and biasing said plunger to a first position in which said seal engages said surface; and a second fluid communication passage formed in said plunger, wherein when said probe is inserted into said opening, said probe engages said plunger to move said plunger against said spring to a second position in which said second fluid communication passage communicates with said first chamber.

4. A valve arrangement according to claim 3, further comprising:

an outer portion carried by said second valve portion, said outer portion having a second chamber formed therein which is in fluid communication with said first chamber, and said outer portion having a fluid passageway portion for fluid connection with the container.

5. A valve arrangement for connecting a container having a wall, to apparatus which is to be fed fluid from the container, said arrangement comprising:

a probe;

a first fluid communication passage formed in said probe;

a first valve portion having an opening formed therein for receiving said probe, said opening extending along a length of said first valve portion;

a flange portion extended from said first valve portion;

a first seal supported on said flange portion for engaging an exterior surface of a wall of a container;

a locking member engaged with said first valve portion for forcing the wall into engagement with said first seal;

a second valve portion connected to said first valve portion, said second valve portion having a first chamber formed therein, said first chamber being in fluid communication with an exterior of said second valve portion, and a surface of said first valve portion defining a wall of said first chamber;

a plunger slidably mounted in said opening and extended into said first chamber;

a second seal carried by said plunger for sealing against said surface;

a spring biasing said plunger to a first position in which said second seal engages said surface; and a second fluid communication passage formed in said plunger, wherein when said probe is inserted into said opening, said probe engages said plunger to move said plunger against said spring to a second position in which said second fluid communication passage communicates with said first chamber.

6. A valve arrangement according to claim 5, further comprising:

an outer portion carded by said second valve portion, said outer portion having a second chamber formed therein which is in fluid communication with said first chamber, and said outer portion having a fluid passageway portion for fluid connection with the container.

7. A container and valve arrangement, comprising:

a container having a wall;

a probe;

a first fluid communication passage formed in said probe;

a first valve portion having an opening formed therein for receiving said probe, said opening extending along a length of said first valve portion;

a flange portion extended from said first valve portion;

a first seal supported on said flange portion for engaging an exterior surface of said wall;

a locking member engaged with said first valve portion for forcing said wall into engagement with said first seal;

a second valve portion connected to said first valve portion, said second valve portion having a first chamber formed therein, said first chamber being in fluid communication with an exterior of said second valve portion, and a surface of said first valve portion defining a wall of said first chamber;

a plunger slidably mounted in said opening and extended into said first chamber;

a second seal carried by said plunger for sealing against said surface;

a spring biasing said plunger to a first position in which said second seal engages said surface; and a second fluid communication passage formed in said plunger, wherein when said probe is inserted into said opening, said probe engages said plunger to move said plunger against said spring to a second position in which said second fluid passage communicates with said first chamber.

8. A valve arrangement according to claim 7, further comprising:

an outer portion carried by said second valve portion, said outer portion having a second chamber formed therein which is in fluid communication with said first chamber, and said outer portion having a fluid passageway portion for fluid connection with the container.

* * * * *